Aug. 2, 1966  J. GEDRICH  3,263,818
OIL FILTERING APPARATUS
Filed Jan. 14, 1964  2 Sheets-Sheet 1
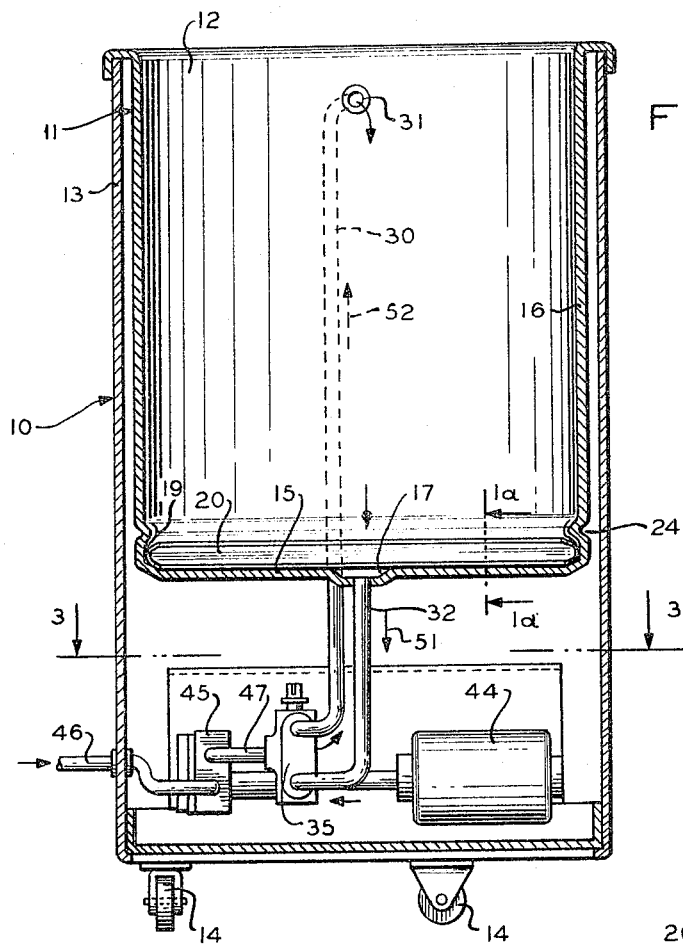
FIG. 1
FIG. 1a
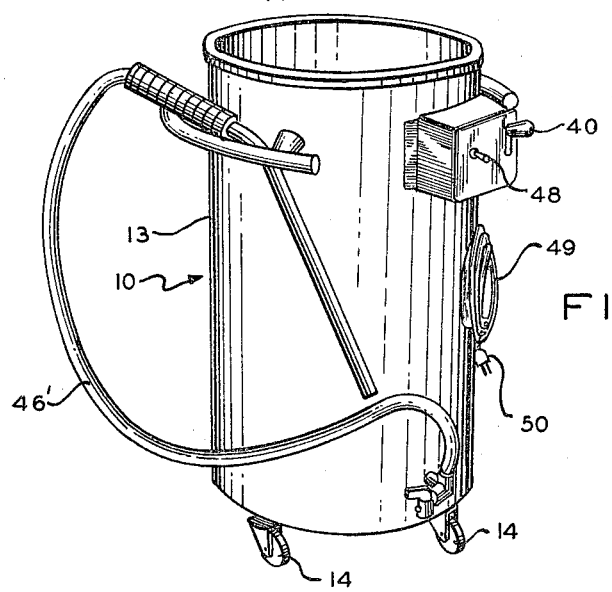
FIG. 2
INVENTOR.
J. GEDRICH
BY Harry Sommers
ATTORNEY Aug. 2, 1966  J. GEDRICH  3,263,818
OIL FILTERING APPARATUS
Filed Jan. 14, 1964  2 Sheets-Sheet 2
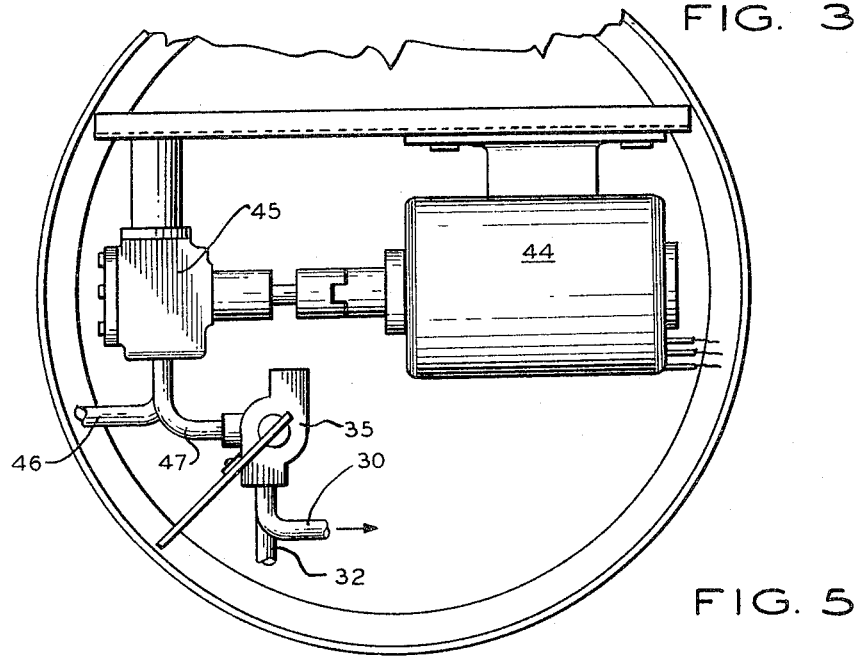
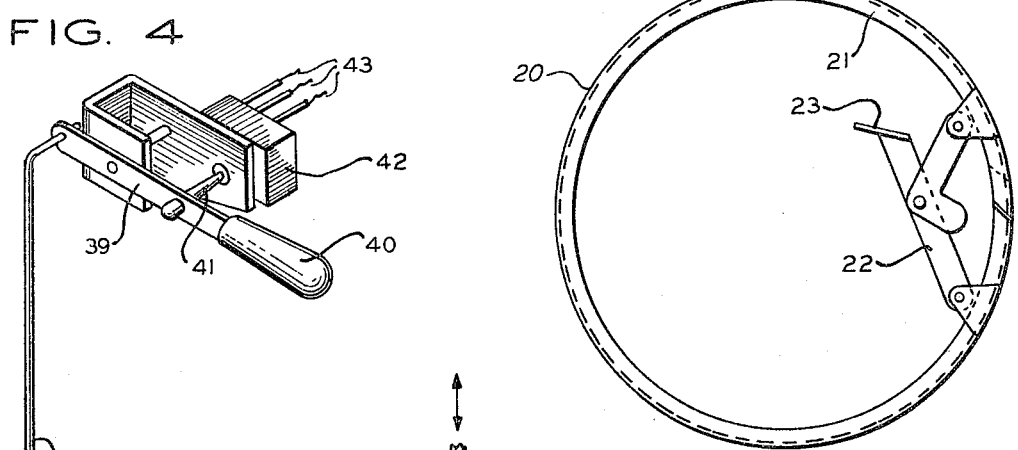
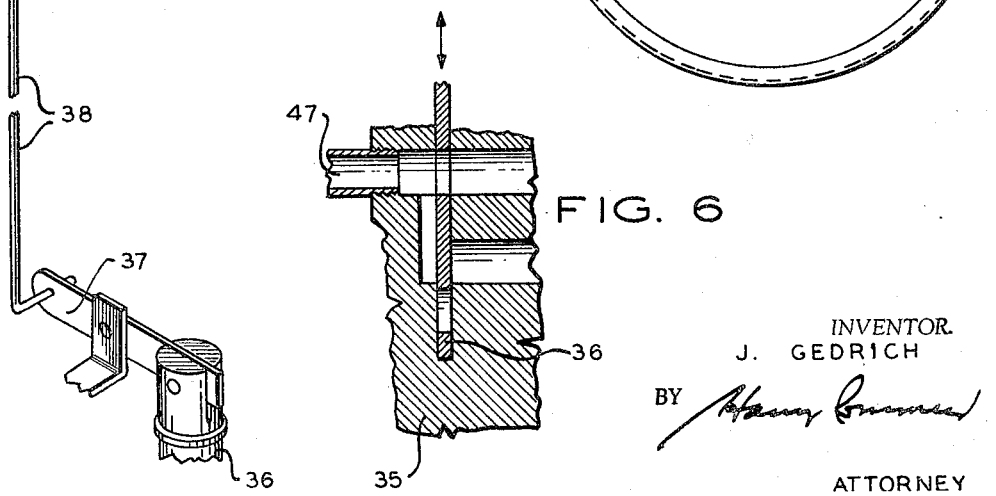
INVENTOR.
J. GEDRICH
BY
ATTORNEY United States Patent Office 3,263,818
Patented August 2, 1966

3,263,818
OIL FILTERING APPARATUS
Jacob Gedrich, Short Hills, N.J., assignor to Keating of Chicago, Inc., Chicago, Ill., a corporation of Illinois
Filed Jan. 14, 1964, Ser. No. 337,647
8 Claims. (Cl. 210—416)

This invention relates to an oil filtering apparatus having novel structural features and which may be formed as a portable unit having a tank movable to a position adjacent a source of oil to be filtered—as for example, from a fryer in a restaurant. The oil may be heated to normal frying temperature, and if desired a powder added thereto to absorb the rancidity; then it may be readily pumped into the tank of the apparatus, filtered and then returned to the fryer—the entire procedure is adapted to be performed more efficiently and in a fraction of the time heretofore required.

The apparatus of this invention eliminates odors and messy cleaning procedures; in transferring the fat or oil for filtering the fryer is cleaned in the process; life of fats and oil is prolonged considerably and it is not necessary to discard the frying fat or oil as frequently as before-adding up to considerable savings. The apparatus is simple to operate and clean.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts:

FIG. 1 is a vertical sectional partly elevational, view of an oil filtering apparatus embodying the invention, FIG. 1a is an enlarged fragmentary vertical sectional view taken at line 1a—1a of FIG. 1, FIG. 2 is a perspective view thereof, FIG. 3 is a partly fragmentary plan view taken at line 3—3 of FIG. 1, FIG. 4 is a perspective schematic view of an oil flow reversing means adapted for use in connection with this invention, FIG. 5 is a top plan view of the expansion ring for locking the filter element in the tank, and FIG. 6 is a fragmentary vertical sectional view of part of a valve means which may be used in connection with the invention.

As shown in the drawings, the apparatus 10 comprises a tank 11 which may have an open top 12 and may be secured to a casing 13 concentrically therewith and having casters 14 or the like for ready portability. The tank 11 has a bottom wall 15, side wall 16 extending upwardly therefrom, and a drain opening 17 below the open top 12 of the tank—preferably at the bottom wall 15 thereof as in FIG. 1.

A grid type of metallic disc 18 (FIG. 1a) is disposed on the bottom wall of the tank and an oil filter sheet 19 positioned on the grid and extended upwardly therefrom and along the side wall 16 of the tank and clamped in place as by being pressed against the side wall of the tank by an expansion ring 20 which may be formed as in FIG. 5. The expansion ring 20 is shown to comprise a split rim or ring 21 having linkage 22 connected to the ends of the split ring 21, said linkage including a handle 23 manually movable in one direction to expand the ring and in the other to contract the ring. On expansion of the ring (after positioning the sheet 19 on a grid type of metallic disc 18) the oil filter sheet 19 is pressed against side wall 16. If desired the side wall may be provided with an inwardly directed ridge 24, preferably parallel with bottom wall 15, the parts being so proportioned that, on assembly of the grid disc 18 on the bottom of the wall of the tank, with the oil filter sheet 19 thereover and the split ring 20 positioned over the oil filter sheet, the described assembly will be disposed intermediate the inwardly directed ridge 24 and the bottom wall 15 of the tank and securely held in position on expansion of the ring 20.

The device is adapted to be moved adjacent a source of oil such as may be contained in a fryer of a restaurant, to clean the oil and return it to the fryer. For that purpose the tank is provided with a first pipe 30 (FIG. 1) opening at one end 31 into the tank, and a second pipe 32 at one end connected with drainage opening 17 in the bottom wall 15 of the tank. A valve 35 is connected with the other ends of the first and second pipes, said valve having axially movable means such as a plate 36 (FIGS. 6 and 4) axially movable as through linkage 37 connected at one end to plate 36 and at the other end to a further linkage or rod 38 and thus to a pivoted lever 39 having a handle 40 and connected to a switch 41 which may pass through the lever 39 to thus connect therewith. Switch 41 is movable in a switch casing 42 for actuating elements in a switch housing 42, connected, as by wires 43, with a reversible motor 44 for driving pump 45, the pump in turn being connected (FIG. 3) as by a conduit 47 to valve 35 and a third pipe 46 being connected to the pump 45.

The conduit 46 may extend exteriorly of the tank (FIG. 2) and a flexible hose or conduit 46' connected at one end therewith, its opposite free end being adapted to be inserted into the source of oil to be filtered pursuant to this invention, to pump the oil into tank 11 (through 46, 35, 30) or out of the tank (through 32, 35, 46) after filtration, selectively.

Pursuant to the invention, by moving the handle 40 to the "in" position (which may be its upper position) the switch 41 will close the circuit through the wires 43 of the motor 44 so that the motor will drive the pump in a given direction to pump the oil from the third pipe 46 into the conduit 47 through the valve 35 and pipe 30 into the interior of the tank 11. An on-off switch may be provided for controlling the source of power to the motor 44 (such as flexible cable 49 (FIG. 2) having an end 50 for connection to a source of current). The oil is pumped as above noted through the valve 35 and through the pipe 30 in the direction of arrow 52, FIG. 1, into the tank 11. It will also be noted that the intake pipe 30 is concealed intermediate casing 10 and tank 11.

When it is desired to filter the oil and return it to the fryer or other place of use, the handle 40 is moved to the other "out" position (for example, to the lower position in FIG. 4) whereupon the switch 41 will be correspondingly moved to reverse the motor 44 and therefor the pump 45 correspondingly; said movement of the handle concurrently actuates the valve plate 36 to connect the second pipe 32 through the valve 35 with the conduit 47 and with the pump 45 (so that the oil will be pumped in the direction of the arrow 51 (FIG. 1)), thence through third pipe 46' and returned to the fryer or other place of use. The filter sheet 19 may be readily replaced when desired by manipulation of the handle 23 to open the split ring 21.

From the foregoing, it will be apparent that the invention provides a novel and highly practical device for the purpose described which is highly efficient, durable and effective in use and operation.

Having thus described my inventon, what I claim as new and desire to secure by Letters Patent is:

1. An oil filtering apparatus comprising a tank, an opening at the bottom of the tank for drainage of oil from the tank, a first pipe opening at one end into the tank above the bottom thereof and a second pipe connected at one end to said drainage opening of the tank, a pump, a third pipe connected to said pump at one end and having an opposite end for connection with a source of oil to be pumped into said tank for filtering therein and from said tank when filtered, a filter element disposed in said tank above the drainage opening, valve means connected with said pump for selectively directing oil in a first direction from the third pipe and through the valve and the first pipe or for directing of oil in another direction from the second pipe and valve through the pump and through the third pipe, means including linkage means to positively operate said valve means, the opposite ends of the first and second pipes being connected with said valve, a motor reversing switch, a reversible motor means under control of said switch and connected with the pump for actuating the pump to pump oil in said directions selectively and a control means connected with said valve linkage means and switch for effecting simultaneous operation thereof.

2. An oil filtering apparatus as set forth in claim 1, in which said valve means includes a plate slidably mounted in the valve for selectively connecting the first and second pipes with the pump.

3. An oil filtering apparatus as set forth in claim 1, in which the filter element is positioned atop the drainage opening in the tank and a friction ring member holds the filter element in place atop the drainage opening in the tank.

4. An oil filtering apparatus as set forth in claim 1, in which said tank has a bottom wall and a side wall upstanding from said bottom wall, said drainage opening being disposed in the bottom wall, said filter element being proportioned to be positioned atop the drainage opening and to overlie the bottom wall of the tank, and there being an expansion ring frictionally pressing the filter element against the side wall of the tank adjacent the bottom wall.

5. An oil filtering apparatus as set forth in claim 4, in which means are disposed in spaced relation to the bottom of the tank for positioning the ring above the bottom of the tank.

6. An oil filtering apparatus as set forth in claim 4, including an apertured screen positioned on the filter element and under the ring.

7. An oil filtering apparatus as set forth in claim 6, in which said expansion ring comprises a split rim and there being a manually movable link connected to the ends of the split rim for expansion of said ring against the side wall of the tank.

8. An oil filtering apparatus as set forth in claim 1, including a casing, said tank being disposed interiorly of the casing and the first pipe being disposed between the walls of the casing and the tank.

References Cited by the Examiner

UNITED STATES PATENTS

| | | | |
|---|---|---|---|
| 39,812 | 9/1863 | Hayman | 137—625.48 X |
| 461,981 | 10/1891 | Miles | 137—625.48 |
| 560,951 | 5/1896 | Thresh | 137—625.48 X |
| 815,874 | 3/1906 | Stransky | 210—480 |
| 1,695,306 | 12/1928 | Wiemer | 210—480 |
| 2,425,848 | 8/1947 | Vawter | 210—241 X |
| 2,477,404 | 7/1949 | Butt | 210—241 |
| 2,902,161 | 9/1959 | Humbert et al. | 210—241 X |
| 3,045,827 | 7/1962 | Hough | 210—241 X |
| 3,107,601 | 10/1963 | Longmire | 210—167 X |
| 3,167,435 | 1/1965 | Hall | 210—167 X |

REUBEN FRIEDMAN, *Primary Examiner.*

J. DECESARE, *Assistant Examiner.*